(12) United States Patent
James

(10) Patent No.: US 7,916,079 B2
(45) Date of Patent: Mar. 29, 2011

(54) GPS SIGNAL SAMPLES WITH TIMING DATA

(75) Inventor: Michael D. James, Hamble (GB)

(73) Assignee: U-BLOX AG, Thalwil (CH)

( * ) Notice: Subject to any disclaimer, the term of this patent is extended or adjusted under 35 U.S.C. 154(b) by 230 days.

(21) Appl. No.: 11/573,870

(22) PCT Filed: Aug. 11, 2005

(86) PCT No.: PCT/IB2005/052672
§ 371 (c)(1),
(2), (4) Date: Feb. 16, 2007

(87) PCT Pub. No.: WO2006/018803
PCT Pub. Date: Feb. 23, 2006

(65) Prior Publication Data
US 2008/0094279 A1 Apr. 24, 2008

(30) Foreign Application Priority Data
Aug. 18, 2004 (EP) .................................... 0418357

(51) Int. Cl.
*G01S 19/35* (2010.01)
*G01S 19/03* (2010.01)
(52) U.S. Cl. ................................ 342/357.75; 342/357.4
(58) Field of Classification Search ........................ None
See application file for complete search history.

(56) References Cited

U.S. PATENT DOCUMENTS

| | | | | |
|---|---|---|---|---|
| 5,379,224 A | * | 1/1995 | Brown et al. | 701/215 |
| 5,420,592 A | * | 5/1995 | Johnson | 342/357.12 |
| 5,434,787 A | * | 7/1995 | Okamoto et al. | 701/214 |
| 5,606,732 A | * | 2/1997 | Vignone, Sr. | 455/269 |
| 6,018,784 A | * | 1/2000 | Gildea et al. | 710/311 |
| 6,104,338 A | | 8/2000 | Krasner et al. | |
| 6,430,503 B1 | | 8/2002 | McBurney et al. | |
| 6,449,485 B1 | * | 9/2002 | Anzil | 455/456.1 |
| 2002/0167442 A1 | * | 11/2002 | Taylor | 342/357.09 |

OTHER PUBLICATIONS

Thor, Jonas et al, "A Direct RF Sampling Multifrequency GPS Receiver," IEEE 2002, pp. 44-51.*
Kaplan, Elliott (editor), *Understanding GPS: Principles and Applications*, Chap. 5, Ward, Phillip,"Satellite Signal Acquisition and Tracking", Artech House, Mobile Communications Series, 1986, pp. 119-209.
Akos, Dennis et al., "Real-Time Software Radio Arcitectures for GPS Receivers", GPS World, Jul. 2001, pp. 1-9 (Best available—pp. 1-20 from http://findarticles.com).

* cited by examiner

*Primary Examiner* — Gregory C Issing
(74) *Attorney, Agent, or Firm* — Blakely, Sokoloff, Taylor & Zafman LLP

(57) ABSTRACT

A GPS receiver (10) is disclosed comprising a GPS antenna and a GPS RF front-end including an analogue to digital converter for sampling received GPS signals and a processor for outputting a stream of the GPS signal samples and inserting repeated instances of timing data indicating the timing of the sampling of the GPS signals in the stream in place of some of the GPS signal samples. Also disclosed is a corresponding method of providing a position fix and a computer program, computer-readable storage medium and apparatus for the same.

7 Claims, 2 Drawing Sheets

GPS SIGNAL SAMPLES WITH TIMING DATA

The present invention relates to a GPS receiver comprising a GPS antenna and a GPS RF front-end including an analogue to digital converter for sampling received GPS signals; and a processor for outputting the GPS signal samples.

The present invention further relates to a corresponding method of providing a position fix comprising the steps of receiving from a GPS receiver GPS signal samples and processing the GPS signal samples to determine a position fix; and to a computer program, computer-readable storage medium and apparatus for the same.

Article "Real-time software radio architectures for GPS receivers" by Akos et al. (GPS World, July 2001) discloses "software GPS" in which much GPS signal processing is accomplished by means of a programmable micro-processor or digital signal processor as opposed to analogue or discrete hardwires components. As illustrated in FIG. 2 of this article, a simplified GPS receiver is provided consisting of a GPS antenna and GPS RF front-end for GPS signal pre-processing (including filtering, amplification and frequency down-conversion) and analogue to digital conversion. GPS signal samples outputted from the GPS receiver are then fed in to a modern PC or laptop running appropriate GPS signal processing software for processing the GPS signals to determine a position fix. The authors of this article have contemplated the GPS receiver to be a "plug-in" module, i.e. a "dongle" type device, which because of its simple architecture could be manufactured cheaply, thereby facilitating widespread adoption. And, of course, the GPS signal processing software which resides on the PC is inherently cheap to replicate.

In order to track a GPS receiver using such an arrangement, a first position fix would normally (in the absence of AGPS data) require acquisition and tracking of the GPS signals over ~30 s to ensure reception of the GPS time of week (TOW) and up to date ephemeris data.

Thereafter, one would not normally continuous track GPS signals as perhaps one would with a conventional hardware based GPS receiver but rather one would periodically resample and timestamp small blocks of GPS signals (commonly termed "snapshots") and reacquire the GPS signals for each block. A position fix on such small snapshots is possible as the time difference between successive snapshots is known (using the timestamps) and hence a measurement of GPS time for a earlier snapshot can then be extrapolated to obtain an estimate of GPS time for a later snapshot for which reacquisition has yet to occur. In addition, ephemeris and estimates of GPS time can be used to simplify the acquisition process as assumptions can be made about observed Doppler and the code phases of the GPS signals in a particular snapshot Therefore, a GPS RF front-end of the type described about would typically output a relative time stamp (i.e. using the timebase of the GPS receiver front-end) followed immediately by a real-time GPS signal sample stream which can be cached in a computer as a snapshot and subsequently processed.

An alternative would be to provide timing information in parallel to a GPS signal sample stream, however, the path carrying the GPS signal sample stream is often the only synchronised signal path between the GPS RF front-end and the computer. Other paths may have timing uncertainties, for example, interrupt pins or input/output ports for example so it is difficult to pass timing information with any precision over a parallel signal path.

In accordance with the present invention, a GPS receiver is provided comprising a GPS antenna and a GPS RF front-end including an analogue to digital converter for sampling received GPS signals and a processor for outputting a stream of the GPS signal samples and inserting repeated instances of timing data (optionally including synchronisation code words) indicating the timing of the sampling of the GPS signals in the stream in place of some of the GPS signal samples.

Also provided in accordance with the present invention is a method of providing a position fix comprising the steps of: identifying in the stream of GPS signal samples repeated instances of timing data indicating the timing of the sampling of the GPS signals; and processing the GPS signal samples using the timing data to determine a position fix; together with a computer program, computer-readable storage medium and apparatus for the same. As is well known in the art, data recorded on a computer-readable storage medium can contain instructions for performing methods such as that of the present invention when executed by a computer.

The inventor has realised that it is not necessary to send such timing information in a separate physical or virtual channel or header preceding a snapshot payload. Rather, one can insert this data directed in to the GPS signal sample stream, i.e. using a single channel and avoiding the need for an additional channel or multiplexing.

A further advantage is that the repeated instances of timing data can be used to check the integrity of the snapshot. For example, if timing data is not where it is expected in the GPS signal sample stream, it is an indication that the GPS signal sample stream has corrupted.

The loss of GPS signal samples has a minimal effect and in fact it is perfectly possible to coherently correlate a block of GPS signal samples containing one or more timestamps to acquire GPS signals.

The present invention will now be described, by way of example only, with reference to the accompanying figures, in which.

Figure 1:
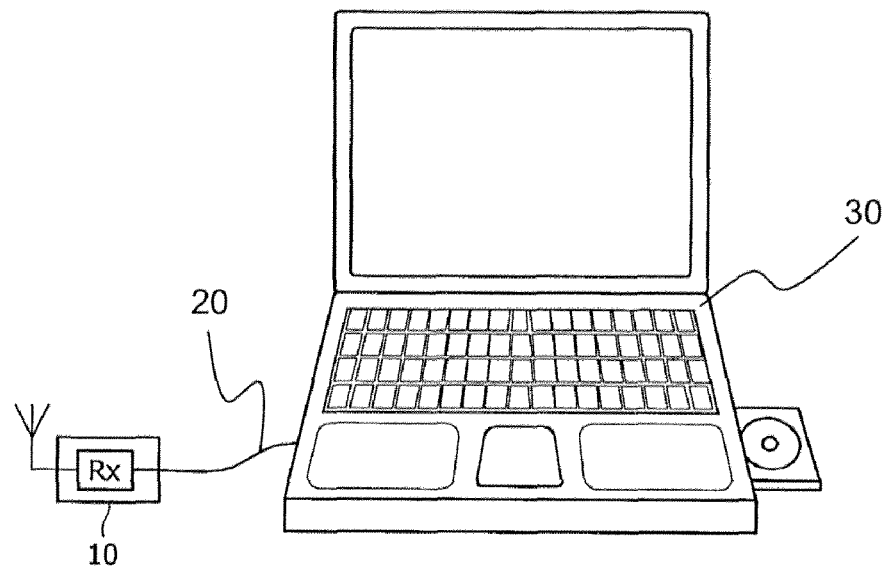
FIG. 1 shows, schematically, a laptop PC connected to a GPS receiver, both operating in accordance with the present invention.
Figure 2:
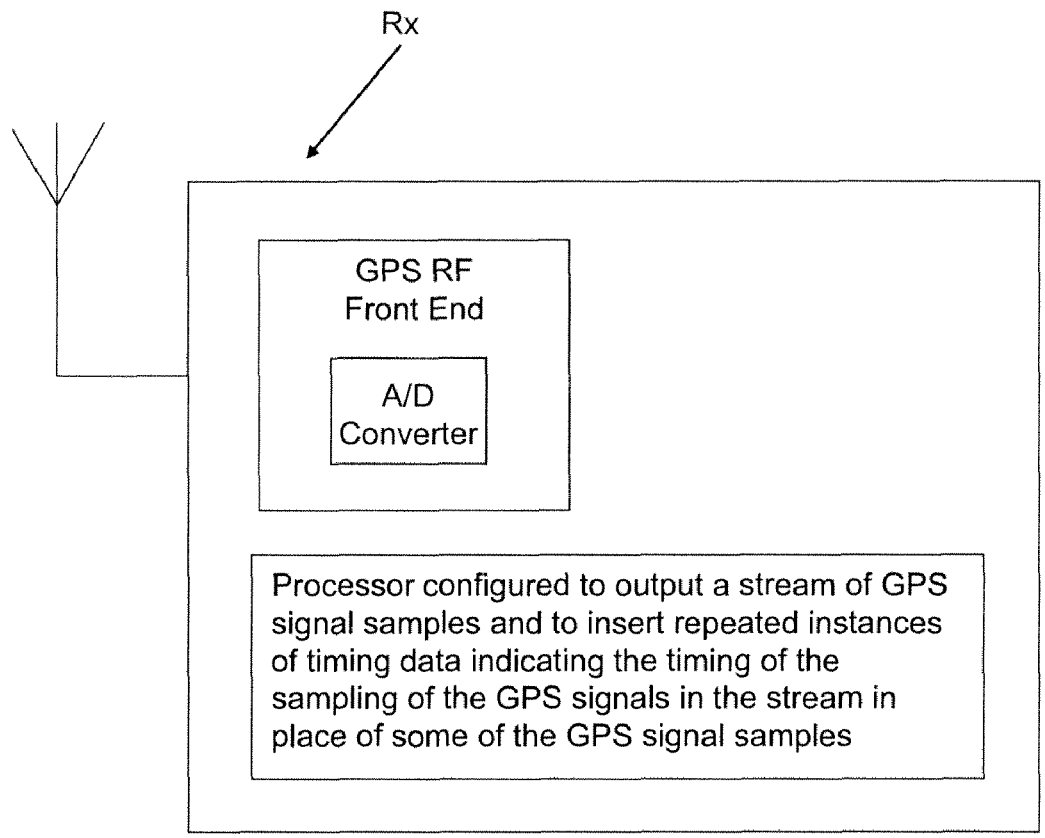
FIG. 2 is a block diagram of a GPS receiver operating in accordance with the present invention.

Referring to the accompanying FIG. 1, the laptop PC is connected via a USB PC port and corresponding cable to the GPS receiver 10 which consists of a GPS RF front-end Rx and a GPS antenna, as shown in FIG. 2. Whilst the GPS receiver could have been a "dongle" type device thereby omitting the cable, the cable facilitates positioning of the GPS receiver (including the antenna) in a prominent position, thereby increasing the chances of acquiring GPS signals. For example, one might place the GPS receiver near a window if operating in doors.

When operative, the GPS receiver receives NAVSTAR SPS GPS signals through its antenna and pre-process them, typically by passive bandpass filtering in order to minimise out-of-band RF interference, preamplification, down conversion to an intermediate frequency (IF) and analogue to digital conversion. The resultant GPS signal samples contain the IF signal which remains modulated, still containing all the information from the available satellites.

In accordance with the present invention, the GPS signal samples are outputted from the GPS receiver via the USB link into PC memory (not shown) with periodic timing data inserted in the stream in place of some of the GPS signal samples and indicating the timing of the sampling of the GPS signals (relative to the time base of the GPS RF front-end).

Using laptop PC based GPS signal processing software the GPS signal samples are then processed using timestamps (as described on page 2 above) so that GPS signals may acquired for the purpose of deriving pseudorange information from which the position of the PC can be determined using conventional navigation algorithms. Such GPS signal acquisition and pseudorange processing is well known, for example, see GPS Principles and Applications (Editor, Kaplan) ISBN 0-89006-793-7 Artech House.

Figure 3:
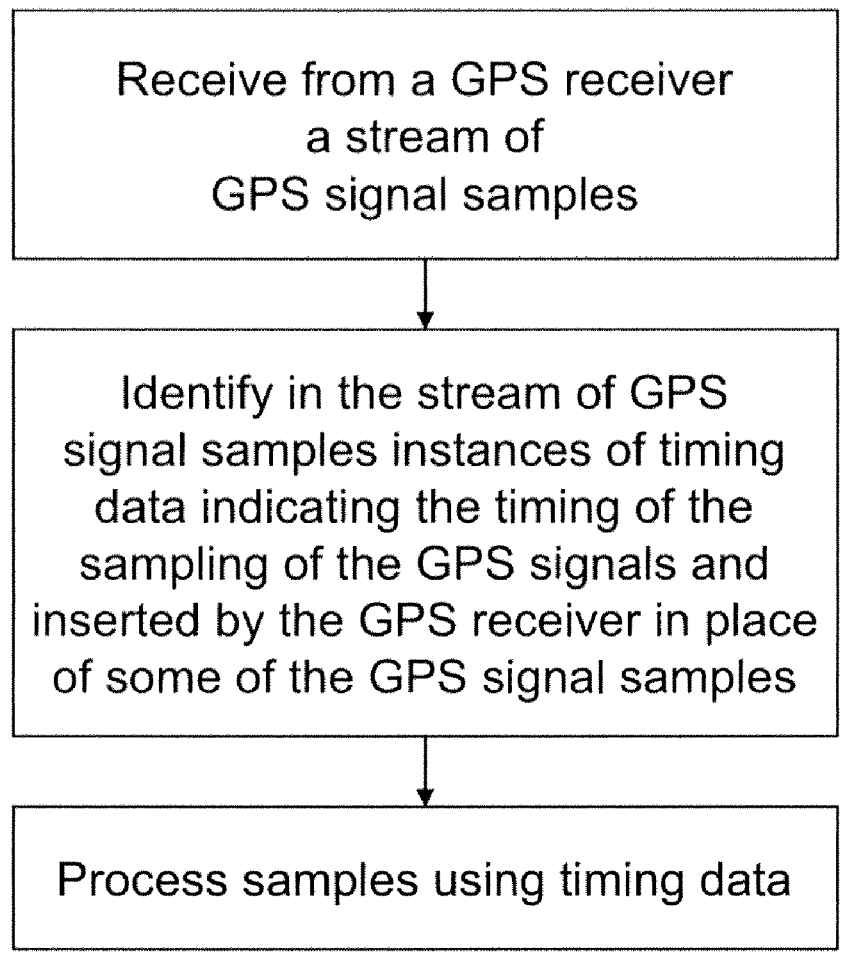
FIG. 3 illustrates a method in accordance with the present invention.
Figure 4:
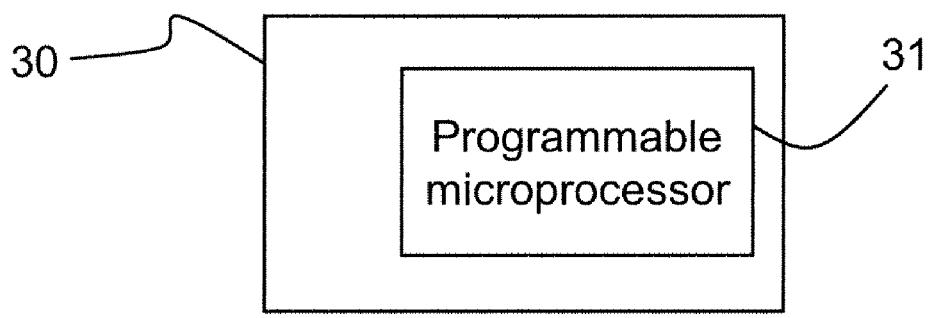
FIG. 4 is a block diagram of the laptop PC of FIG. 1.

Referring to FIG. 3, an instance of timing data may be identified by searching in the stream of GPS signal samples for an expected instance of timing data based on a previously identified instance of timing data or, alternatively, where synchronisation code word is used, by searching in the stream of GPS signal samples for such a synchronisation code word. Ideally, if a synchronisation code word is used, it is chosen so as to have a very low probability of appearing in a GPS signal sample stream.

Whilst the present invention has been illustrated in the context of a laptop PC, it is of course equally applicable to other apparatus able to support GPS signal processing software and to which a GPS receiver according to the present invention can be connected. For example, the invention may be employed with mobile devices such as PDAs and telephone; or generally stationary objects such as a TVs or TV set-top boxes.

Also, whilst the connection between the GPS receiver and the GPS signal processing software is entirely wired in the above example, it could conceivable involve a wireless link.

Finally, whilst the invention has been described in the context of NAVSTAR GPS, the all weather, spaced based navigation system developed and currently operated by the US Department of Defense, it will be appreciated that the invention is equally applicable to other global positioning systems including GLONASS and Galileo and hybrids thereof.

The invention claimed is:

1. A GPS receiver comprising a GPS antenna and a GPS RF front-end including an analogue to digital converter configured to sample received GPS signals and a processor configured to output a stream of the GPS signal samples and to insert instances of timing data indicating the timing of the sampling of the GPS signals in the stream in place of some of the GPS signal samples.

2. A GPS receiver according to claim 1 wherein the timing data includes a synchronisation code word.

3. A method of providing a position fix comprising the steps of:
   receiving from a GPS receiver a stream of GPS signal samples, the stream including instances of timing data indicating the timing of the sampling of the GPS signals and inserted by the GPS receiver in place of some of the GPS signal samples;
   identifying in the stream of GPS signal samples the instances of timing data; and
   processing the GPS signal samples using the timing data to determine a position fix.

4. A method according to claim 3 wherein an instance of timing data is identified by searching in the stream of GPS signal samples for an expected instance of timing data based on a previously identified instance of timing data.

5. A method according to claim 3 wherein an instance of timing data is identified by searching in the stream of GPS signal samples for a synchronisation code word.

6. A computer-readable storage medium having recorded thereon data containing instructions for performing a method according to claim 3.

7. Apparatus configured to provide a position fix comprising:
   a wired or wireless connection (20), for receiving from a GPS receiver a stream of GPS signal samples, the stream including instances of timing data indicating the timing of the sampling of the GPS signals and inserted by the GPS receiver in place of some of the GPS signal samples;
   a programmable microprocessor or digital signal processor (31), for identifying in the stream of GPS signal samples the instances of timing data; and
   a programmable microprocessor or digital signal processor (31), for processing the GPS signal samples using the timing data to determine a position fix.

* * * * *